UNITED STATES PATENT OFFICE.

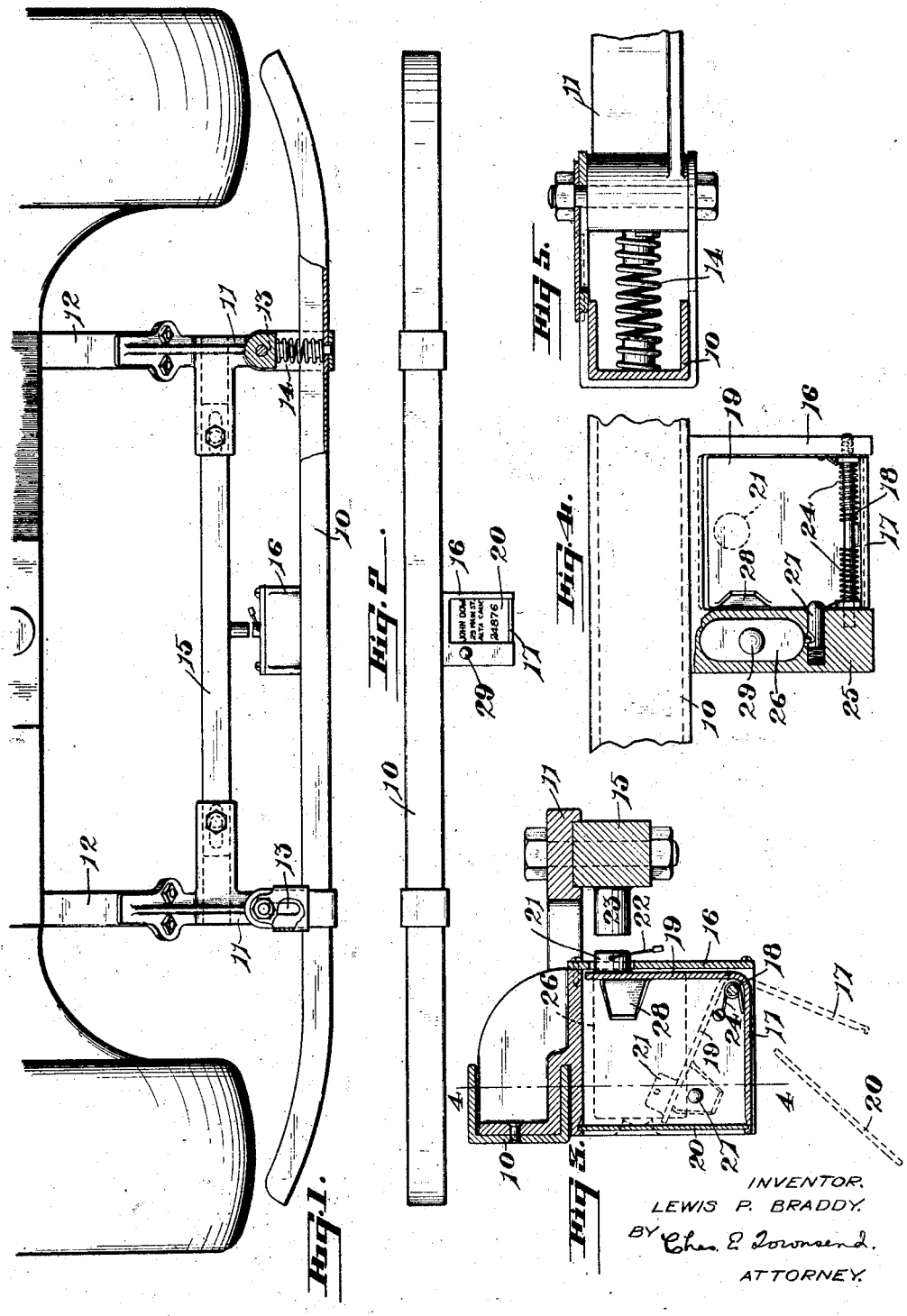

LEWIS P. BRADDY, OF SAN FRANCISCO, CALIFORNIA.

IDENTIFICATION FENDER FOR VEHICLES.

1,423,905.  Specification of Letters Patent.  Patented July 25, 1922.

Application filed January 4, 1922. Serial No. 526,980.

*To all whom it may concern:*

Be it known that I, LEWIS P. BRADDY, a citizen of the United States, residing at the city and county of San Francisco and State of California, have invented new and useful Improvements in Identification Fenders for Vehicles, of which the following is a specification.

This invention relates to identification means for use with vehicle fenders or bumpers, the purpose of which is to release some sort of an identification device when the vehicle meets with a collision.

In a prior application Serial No. 373,948 filed by me April 14th, 1920, I show and describe a fender or bumper for vehicles combined with which is a holder to contain an identification plate or card. The release of the plate or card is effected by means actuated by the movement of the bumper under the force of an impact. The present invention has for its object to simplify and improve the construction and operation of a device of the character above mentioned.

Chief among these improvements may be mentioned the capability of the present device to permit the holder for the identification plate to be sealed by the proper officials. This seal is so arranged as to be broken when the bumper or fender strikes an obstruction whereby to release the holder and allow the identification plate to fall to the ground. It is intended that new plates and seals shall be furnished only by the proper officials as a means of getting information concerning collisions. A further improvement effected is the employment of a conventional type of yielding bumper which, by its movement under force of impact, will act directly to release the holder for the identification plate, thereby dispensing with special actuating means, such as bell cranks, etc., employed in prior devices. A further improvement resides in the provision of a visible signal which is normally inoperative and is put in operation simultaneously with the release of the identification plate so that the attention of others will be directed to the condition of the identification plate holder.

One form which my invention may assume is exemplified in the following description and illustrated in the accompanying drawings, in which—

Fig. 1 shows a plan view of the front portion of a vehicle fitted with a bumper and identification device embodying my invention.

Fig. 2 shows a front view of the bumper and holder for the identification device.

Fig. 3 shows a vertical central sectional view of the device shown in Fig. 1.

Fig. 4 is a sectional view taken on the line 4—4 of Fig. 3.

Fig. 5 shows a detail sectional view along one of the attaching brackets for the bumper bar.

Referring in detail to the accompanying drawings, I show a bumper bar 10 of conventional form carried by attaching brackets 11, the latter being connected to frame bars 12 of a vehicle. The bumper bar is movably mounted in slotted ends 13 of the brackets 11 and is held outwardly by cushioning springs 14. A rigid cross bar 15 connects opposite brackets together at the rear of the bumper bar. The bumper bar itself carries a box-like holder 16, the bottom wall 17 of which is hinged at 18 and has an upwardly extending wing 19 disposed within the box. In the front of the box is arranged an identification plate 20 fitted in grooves in the top and bottom walls. When the bottom wall is closed a projection 21 on the upstanding wing 19 extends through an opening in the rear wall of the box and is held in place by means of a seal 22. In this position the identification plate 20 will be securely held between the top and bottom walls. In line with the projection 21 and fixed upon the cross bar 15 is a striker or lug 23 to co-operate with the projection 21 for the purpose of breaking the seal 22 and releasing the bottom wall of the holder.

In operation, when the bumper strikes an obstruction, as in the case of a collision, it is moved rearwardly against the springs 14, causing the lug 23 to strike the projection 21 and break the seal. The bottom wall is then free to drop downwardly, thus releasing the identification plate 20. The position of the upstanding wing 19 will be such as to insure that the identification plate falls outside the box. If desired, the bottom wall may be weighted to insure its dropping downwardly, or a spring 24 may be employed to assist in the downward movement of the bottom wall.

At one side of the box-like holder is a thick wall 25 formed with a pocket or cavity to receive a flash-light 26. Fitted within the wall 25 is a spring-pressed plunger 27 to actuate the switch of the flash-light. This plunger is normally held extended slightly within the box-like holder and fixed upon the upstanding wing 19 is a beveled or inclined lug 28 to co-operate with the outstanding plunger. Thereby, when the holder is released and the bottom wall falls downwardly, the lug 28 will come into contact with the plunger 27 shoving the latter inwardly so as to actuate the switch of the flash-light. The wall 25 is provided with a small lens or bull's-eye 29 at its front through which the light from the flash-light shines so that the attention of others will be called to the condition of the identification plate holder.

The plate 20 is a necessary part of the enclosing casing and contains the name of the owner, the number of the car and other data on its face in full view at all times. Its absence will thus be conspicuous and serve to call the attention of others to the fact of a collision. In order to get a new plate and seal a driver must report to the proper officials.

Various changes in the construction and arrangement of the several parts herein shown and described may be employed without departing from the spirit of this invention as disclosed in the appended claims. For instance, any type of yielding bumper may be used and the holder for the identification plate may be positioned on the stationary member 15 and the striker or lug 23 may be arranged upon the bumper bar.

Having thus described my invention, what I claim and desire to secure by Letters Patent is:

1. In a vehicle, in combination with a bumper bar yieldingly mounted with respect to the frame of the vehicle, of a holder including a movable retaining device for an identification plate mounted on said bumper bar, means for sealing said movable retaining device in position, and a releasing member rigidly connected with the frame of the vehicle and adapted to co-operate with the retaining device whereby movement of the bumper bar under the force of impact will bring them into engagement to break the seal and release the identification plate.

2. In a vehicle, in combination with a bumper bar yieldingly mounted with respect to the frame of the vehicle, of an identification plate holder fixed to said bumper bar, a movable retaining member pivotally connected to said holder and adapted to support the identification plate within the holder under normal conditions, and a releasing member rigidly connected to the frame of the vehicle and adapted to engage said movable retaining member when movement is imparted to said bumper bar by force of impact, said engagement causing movement of said retaining member and release of the identification plate.

3. In a vehicle, in combination with a bumper bar yieldingly held with respect to the frame of the vehicle, of an identification plate holder fixed to said bumper bar, a movable retaining member pivotally connected to said holder and adapted to co-operate therewith in supporting an identification plate under normal conditions, means for sealing said retaining member in position, a cross-bar fixed to the frame of the vehicle at the rear of the bumper, and a releasing member fixed on said cross bar and adapted to engage said movable retaining member when movement is imparted to the bumper by force of impact, the engagement causing breakage of the seal and release of the identification plate.

4. In combination with a bumper yieldingly mounted upon the frame of a vehicle, a holder for an identification plate comprising a box-like structure having a movable wall, an identification plate releasably held in position by said movable wall, means for retaining the movable wall in closed position and a striker rigidly connected to the vehicle and adapted to be brought into engagement with the movable wall by the yielding movement of the bumper to release the movable wall and discharge said plate.

5. The combination with a bumper yieldingly mounted upon the frame of a vehicle of a holder for an identification plate comprising a box-like structure having a hinged bottom wall, an identification plate forming the front wall of the box and releasably held in place by the hinged bottom wall, means to retain the hinged bottom wall in closed position, and a striker rigidly connected to the vehicle and engageable with the retaining means to release the hinged wall and allow the identification plate to be discharged.

6. In combination with a bumper bar yieldingly mounted with respect to the frame of a vehicle, a stationary element at the rear of the bumper bar, a box-like holder mounted on the bumper bar, said holder including a hinged bottom wall and an identification plate releasably fitted in the front of the box and constituting the front wall thereof, means for retaining the bottom wall in closed position and a lug on the stationary element to co-operate with the retaining means for the purpose of releasing the latter when the bumper is moved rearwardly under force of impact.

LEWIS P. BRADDY.